E. WRIGHT.
TRACTION WHEEL.
APPLICATION FILED DEC. 7, 1914.
1,197,883.
Patented Sept. 12, 1916.
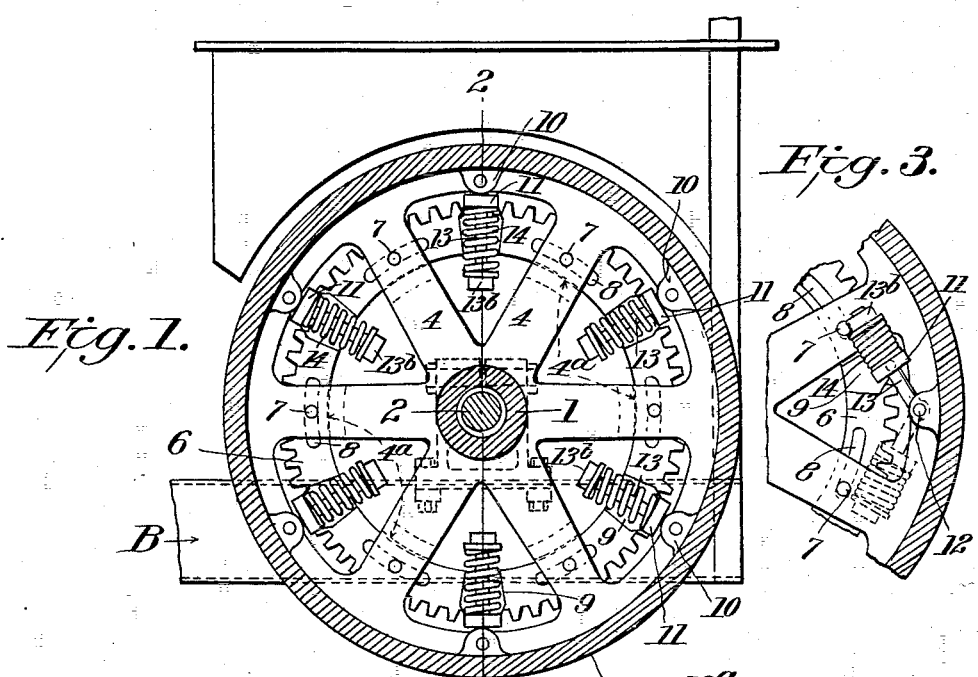
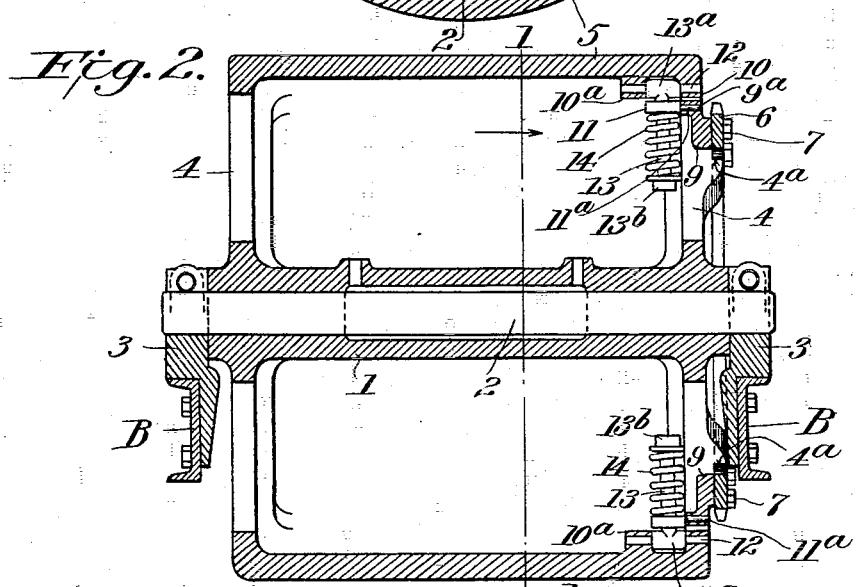
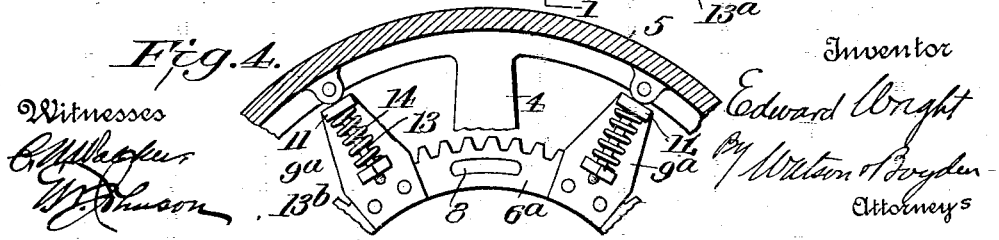

UNITED STATES PATENT OFFICE.

EDWARD WRIGHT, OF BROOKLYN, NEW YORK.

TRACTION-WHEEL.

1,197,883. Specification of Letters Patent. Patented Sept. 12, 1916.

Application filed December 7, 1914. Serial No. 875,881.

*To all whom it may concern:*

Be it known that I, EDWARD WRIGHT, a subject of the King of Great Britain, residing at Brooklyn, in the county of Kings and State of New York, have invented certain new and useful Improvements in Traction-Wheels, of which the following is a specification.

In road rollers and other heavy tractors, the driving force is usually applied from the power plant to the driving roll or wheels through a driving gear rigidly mounted on the axle or upon the spokes of the wheels. In the former case, the driving stress is transmitted to the treads of the rolls or wheels through the axle, keys, hubs, and spokes, and in the latter case, through the spokes. In either case, the spokes are sometimes subjected to sudden breaking strains by reason of obstacles opposing the movement of the wheel tread, while the spokes are subjected to shocks due to the momentum of the engine fly wheel. These shocks are also injurious to the various parts of the driving train.

The object of this invention is to provide means for relieving the shocks to the spokes of the driving roller or traction wheels, and also to provide an elastic connection between the driving train and the roll or wheels which will, where the tractor is driven by a constantly running internal combustion engine, facilitate starting the tractor from a state of rest without shock to the driving train, or the wheel spokes, and also lessen the danger of stalling the motor.

To this end, the invention comprises a driving gear mounted upon the spokes of the tractor wheel concentrically with its axis and having a limited turning movement relative to the wheel, swiveled eyes supported at different points around the gear and close to the wheel tread, traction bolts swiveled to the tread and projecting through said eyes, and springs interposed between the free ends of said bolts and said eyes, the arrangement being such that the operation of the gear in either direction will apply a yielding tangential pull to the tread of the wheel without exerting tractive stress upon the wheel spokes.

In the accompanying drawing which illustrates my invention, Figure 1 is a central transverse section through the driving roll of a power driven road roller; Fig. 2 is a section on the line 2—2 of Fig. 1; Fig. 3 is a detail view illustrating the operation of the yielding connections between the driving gear and roll; and, Fig. 4 is a transverse section through part of the tractor wheel or roll, showing a gear of relatively smaller diameter than that illustrated in Figs. 1 and 2, and with extended lugs on the gear to support the swiveled eyes close to the wheel tread.

Referring to the drawing, A indicates a tractor wheel, which, in this instance, is illustrated as the driving roll of a power driven road roller, the frame of the latter being partly shown at B. The tractor wheel or roll shown comprises a hub 1, sleeved on an axle 2, which is mounted in bearings 3, spokes 4, and a tread 5 cast integral with the hub. As the driving force is not transmitted through the axle, the latter may be, and preferably is, fixed in the bearings 3. The spokes, at one side of the roll, are provided with shoulders 4$^a$ at equal radial distances from the axis of the roll, and these shoulders form bearings for an annular spur driving gear 6, which is held in position by headed studs 7 extending through arcuate slots 8 in the gear and secured to the spokes. The gear is free to revolve to a limited extent on the shoulders, the studs serving merely to hold the gear in place.

In Figs. 1 to 3, inclusive, a gear of relatively large diameter is shown, and short lugs 9, secured to the inner side of the gear, project radially outward close to ears 10 on the inner side of the tread 5. Eyes 11 are provided on the inner sides of each of the several lugs, each eye having a shank 11$^a$ which has a bearing in an opening 9$^a$ extending through the lug parallel with the axis of the roll. The eyes are thus swiveled to the lugs. There are two ears, 10 and 10$^a$, on the inner side of the tread opposite each lug on the driving gear, and each pair of ears is perforated parallel with the axis of the roll to receive a bearing pin 12. On each bearing pin is swiveled a traction bolt 13 which extends through the eye swiveled to the adjacent lug on the gear. As shown, each traction bolt has a head 13$^a$ at one end through which the bearing pin extends, and at its free end the bolt has an adjustable nut 13$^b$. Between this nut and the swiveled eye is arranged a compression spring 14, the tension of which may be regulated by the adjustment of the nut.

Any desired number of these spring connecting devices may be arranged between the driving gear and the roll, six being shown in the drawing. Where the driving gear is of large diameter, the lugs on the gear will be short, as shown in Figs. 1 and 2; but with a smaller gear, as shown at 6ª in Fig. 4, the lugs will be extended as shown at 9ª, in order to support the swiveled eyes as closely as possible to the pivotal points of the traction bolts.

In operation, the adjusting nuts on the traction bolts are set so as to cause the springs to exert a normal pressure of say one hundred pounds upon the bolts, which is sufficient to hold the bolts in radial positions, as shown in Fig. 1. If, now, a driving force is applied to the gear wheel, in one direction, the swiveled eyes will turn the bolts from their radial positions into the approximately tangential position shown in full lines in Fig. 3. During this movement the springs will be gradually compressed, and if the driving force required to move the wheel is sufficient, the springs will, in the approximately tangential positions of the traction bolts, be completely closed. This condition marks the limit of movement of the gear relative to the roll, and thereafter the drive will be positive and not yielding. However, the springs are strong enough to serve as shock absorbers and will relieve the spokes and prevent strain from sudden shocks caused by obstacles or ruts in the roadway, which would suddenly retard the rolling movement of the wheel or roll. When the driving force applied to the gear wheel is cut off, by throwing the clutch or stopping the engine, the springs will return the gear to its normal position, shown in Fig. 1, in which position the traction bolts stand radially. If, now, the power applied to the driving gear is reversed, the gear will move relatively to the wheel tread in the opposite direction from that previously assumed, and the traction bolts and springs will swing out into the position shown in dotted lines in Fig. 3, the action being the same as before, only reversed.

It will be noted that in the construction above described, the traction bolts may swing through a large arc, and that the pull on the bolts will be nearly tangential to the tread of the wheel or roll, which is due to the fact that the swiveled eyes connected with the gear are brought out as closely as possible to the pivotal points of the bolts in the tread of the wheel.

What I claim is:

1. The combination with a traction wheel and a driving gear mounted to turn about the axis thereof, of eyes pivotally supported by the gear adjacent the rim of the wheel upon axes transverse to the plane of the gear, traction bolts, one for each eye, pivoted to the rim of the wheel adjacent said eyes and extending radially inward through the eyes, each bolt adapted to swing in a plane parallel with the gear past the radial position, and springs interposed between said eyes and the free ends of the bolts.

2. The combination with a traction wheel and a driving gear mounted to turn on the spokes thereof, of eyes pivotally supported by the gear adjacent the rim of the wheel upon axes transverse to the plane of the gear, traction bolts, one for each eye, pivoted to the rim of the wheel adjacent said eyes and extending radially inward through the eyes, each bolt adapted to swing in a plane parallel with the gear past the radial position, and springs interposed between said eyes and the free ends of the bolts.

3. The combination with a traction wheel and driving gear mounted to turn about the axis thereof, of lugs projecting from the gear into proximity to the rim of the wheel, eyes pivotally supported by said lugs adjacent the rim of the wheel upon axes transverse to the plane of the gear, traction bolts, one for each eye, pivoted to the rim of the wheel adjacent said eyes and extending radially inward through the eyes, each bolt adapted to swing in a plane parallel with the gear past the radial position, and springs interposed between said eyes and the free ends of the bolts.

4. The combination with a traction wheel having spokes and an annular series of shoulders upon one side of the spokes, of an annular driving gear having a bearing on said shoulders and suitably held in position thereon, lugs upon the driving gear, eyes pivotally supported by said lugs adjacent the rim of the wheel upon axes transverse to the plane of the gear, traction bolts, one for each eye, pivoted to the rim of the wheel adjacent said eyes and extending radially inward through the eyes, each bolt adapted to swing in a plane parallel with the gear past the radial position, and springs interposed between said eyes and the free ends of the bolts.

In testimony whereof I have affixed my signature, in presence of two witnesses.

EDWARD WRIGHT.

Witnesses:
GEORGE F. BENTLEY,
JOSEPH N. SPIER.

Copies of this patent may be obtained for five cents each, by addressing the "Commissioner of Patents, Washington, D. C."